United States Patent
Chen

(10) Patent No.: US 8,190,013 B2
(45) Date of Patent: May 29, 2012

(54) OPTICAL SYSTEM

(75) Inventor: Cheng-Heng Chen, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 0 days.

(21) Appl. No.: 12/641,302

(22) Filed: Dec. 17, 2009

(65) Prior Publication Data

US 2011/0150449 A1    Jun. 23, 2011

(51) Int. Cl.
*G03B 3/10*    (2006.01)
*G03B 17/00*    (2006.01)

(52) U.S. Cl. .................................. 396/133; 396/529

(58) Field of Classification Search .................. 396/133, 396/144, 529; 348/340, 374; 359/819–824; 257/432; 438/57, 64, 65

See application file for complete search history.

(56) References Cited

U.S. PATENT DOCUMENTS

| 7,593,630 | B2 * | 9/2009 | Hsiao et al. ................. 396/85 |
| 2005/0271375 | A1 * | 12/2005 | Watanabe et al. .............. 396/144 |
| 2007/0166029 | A1 * | 7/2007 | Lee et al. ..................... 396/529 |
| 2008/0151098 | A1 * | 6/2008 | Yu ................................ 348/374 |
| 2010/0084726 | A1 * | 4/2010 | Lee et al. ..................... 257/432 |
| 2010/0177411 | A1 * | 7/2010 | Hegde et al. ................. 359/823 |

* cited by examiner

*Primary Examiner* — W. B. Perkey
*Assistant Examiner* — Minh Phan
(74) *Attorney, Agent, or Firm* — Jianq Chyun IP Office

(57) ABSTRACT

An optical system including a photo sensor, a wafer level optical (WLO) lens module and a focusing motor is provided. The WLO lens module is located at the photo sensor. The WLO lens module includes at least one transparent substrate and at least one lens, wherein the lens is disposed on the transparent substrate. The focusing motor is located between the WLO lens module and the photo sensor. The focusing motor drives the WLO lens module to move toward or backward the photo sensor.

7 Claims, 3 Drawing Sheets

OPTICAL SYSTEM

BACKGROUND OF THE INVENTION

1. Field of the Invention

The present invention relates to an optical system. More particularly, the present invention relates to an optical system.

2. Description of Related Art

As electronic products have a general trend of miniaturization and low price, a wafer level module (WLM) technique is disclosed. The WLM technique is mainly to fabricate the electronic product according to a wafer level fabrication technique, so as to miniaturize a size of the electronic product and reduce a cost thereof. Wherein, the WLM technique can also be applied for fabricating an optical system, so that a size of the optical system can be reduced compared to that of a conventional optical system, and accordingly the miniaturized optical system can be applied to, for example, a camera module of a mobile phone.

FIG. 1 is a schematic diagram of a conventional optical system. Referring to FIG. 1, the optical system 100 includes a photo sensor 110, an optical lens 120 and a focusing motor 130. The focusing motor 130 is located on the photo sensor 110. The optical lens 120 is located in the focusing motor 130, and the focusing motor 130 is adapted to control a relative movement of the optical lens 120, so as to drive the optical lens 120 to move toward or backward the photo sensor 110.

In the optical system 100, the optical lens 120 includes two transparent substrates 122 and a plurality of lenses 124 located on the transparent substrates 122. The focusing motor 130 includes a telescopic structure 132, wherein the telescopic structure 132 is inlaid to the optical lens 120, so that when the telescopic structure 132 is driven by the focusing motor 130, it can control the optical lens 120 to move toward or backward the photo sensor 110.

The optical lens 120 is located in the focusing motor 130, and the focusing motor 130 can drive the optical lens 120 to move toward or backward the photo sensor 110 through the telescopic structure 132 inlaid to the optical lens 120. However, a whole size of the optical system 100 cannot be effectively reduced due to such a structure, so that miniaturization of the whole size is hard to be achieved.

SUMMARY OF THE INVENTION

Accordingly, the present invention is directed to an optical system, in which a whole size of the optical system can be effectively reduced.

The present invention provides an optical system including a photo sensor, a wafer level optical (WLO) lens module and a focusing motor. The WLO lens module is located on the photo sensor, and includes at least one transparent substrate and at least one lens, wherein the at least one lens is disposed on the at least one transparent substrate. The focusing motor is located between the WLO lens module and the photo sensor. The focusing motor drives the WLO lens module to move toward or backward the photo sensor.

In an embodiment of the present invention, if the at least one transparent substrate is plural, the WLO lens module further includes at least one spacer layer, and each spacer layer is disposed between the transparent substrates.

In an embodiment of the present invention, a material of the spacer layer is a light-shielding material or a light-absorbing material.

In an embodiment of the present invention, the at least one lens is a convex lens or a concave lens.

In an embodiment of the present invention, the focusing motor includes a telescopic structure. The telescopic structure is connected to the WLO lens module, and controls the WLO lens module to move toward or backward the photo sensor. In an embodiment of the present invention, the telescopic structure is a thread structure.

The present invention provides another optical system including a photo sensor, a first WLO lens module, a second WLO lens module and a focusing motor. The first WLO lens module is disposed on the photo sensor, and includes a first transparent substrate and a first lens, wherein the first lens is disposed on the first transparent substrate. The second WLO lens module is located above the first WLO lens module, and a space is maintained between the first WLO lens module and the second WLO lens module. The second WLO lens module includes a second transparent substrate and a second lens, wherein the second lens is disposed on the second transparent substrate. The focusing motor is located between the first WLO lens module and the second WLO lens module, and is suitable for moving the first WLO lens module or the second WLO lens module to adjust the space.

In an embodiment of the present invention, the optical system further includes at least one spacer layer disposed between the first transparent substrate and the photo sensor, between the first transparent substrate and the focusing motor or between the second transparent substrate and the focusing motor. In an embodiment of the present invention, a material of the at least one spacer layer is a light-shielding material or a light-absorbing material.

In an embodiment of the present invention, the at least one first lens and the at least one second lens include a convex lens or a concave lens.

In an embodiment of the present invention, the focusing motor includes a telescopic structure. The telescopic structure is connected to the first WLO lens module or the second WLO lens module, so as to move the first WLO lens module or the second WLO lens module to adjust the space. In an embodiment of the present invention, the telescopic structure is a thread structure.

In an embodiment of the present invention, the focusing motor is a stepping motor.

In an embodiment of the present invention, the photo sensor is a complementary metal oxide semiconductor (CMOS) sensor or a charge coupled device (CCD).

According to the above descriptions, in the optical system of the present invention, the focusing motor can be disposed between the WLO lens module and the photo sensor or between the WLO lenses, so that a size of the focusing motor is relatively reduced to cope with the size of the WLO lens module, and therefore a whole size of the optical lens can be reduced. Moreover, since the focusing motor is disposed between the WLO lens module and the photo sensor or between the WLO lenses, during imaging, the optical system may have a [[zoom]]ing function and a focusing function, and an image light can be imaged on the photo sensor, optimally. In other words, the optical system of the present invention not only has a relatively small size, but also has a good optical imaging quality.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
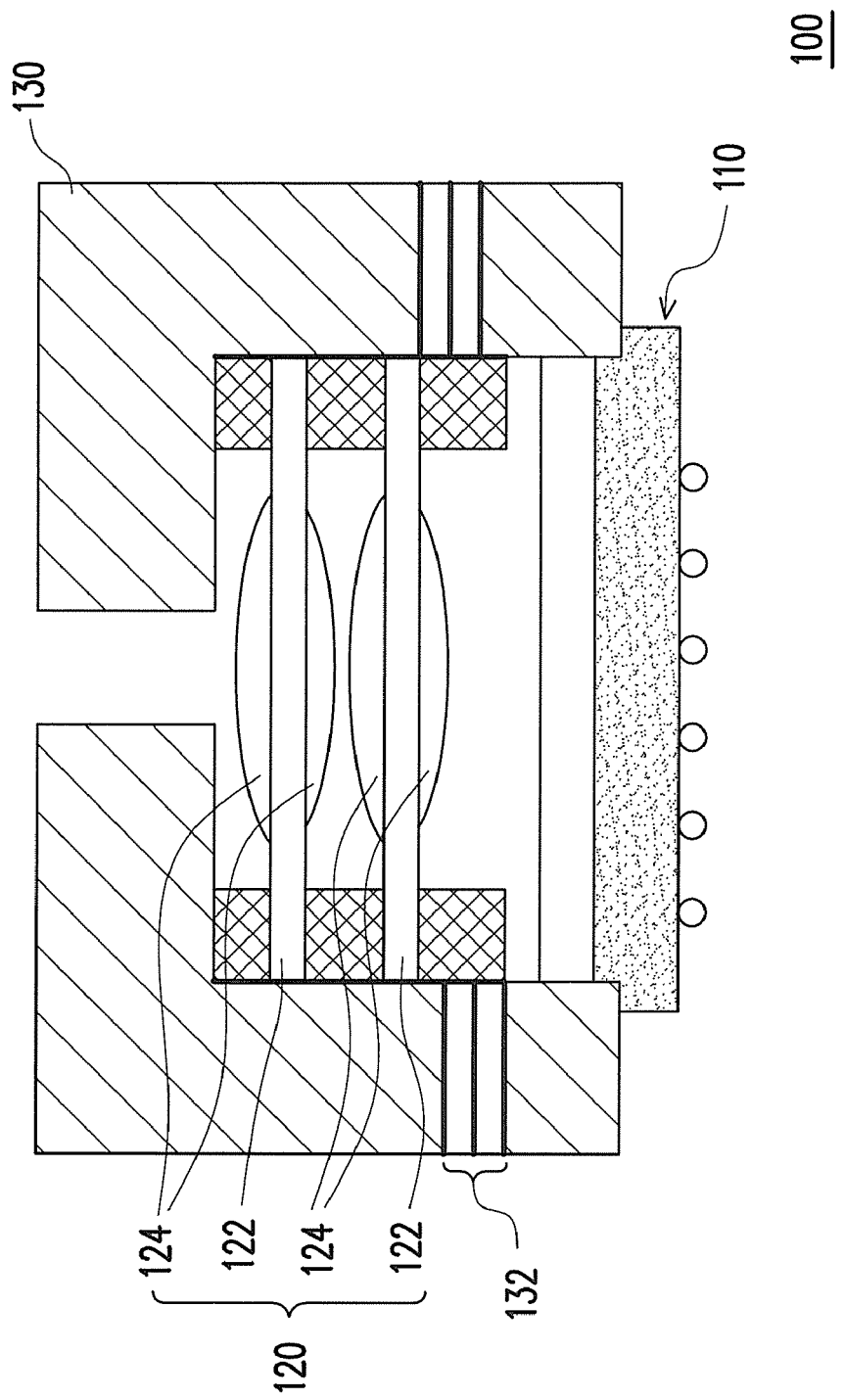
FIG. 1 is a schematic diagram of a conventional optical system.
Figure 2:
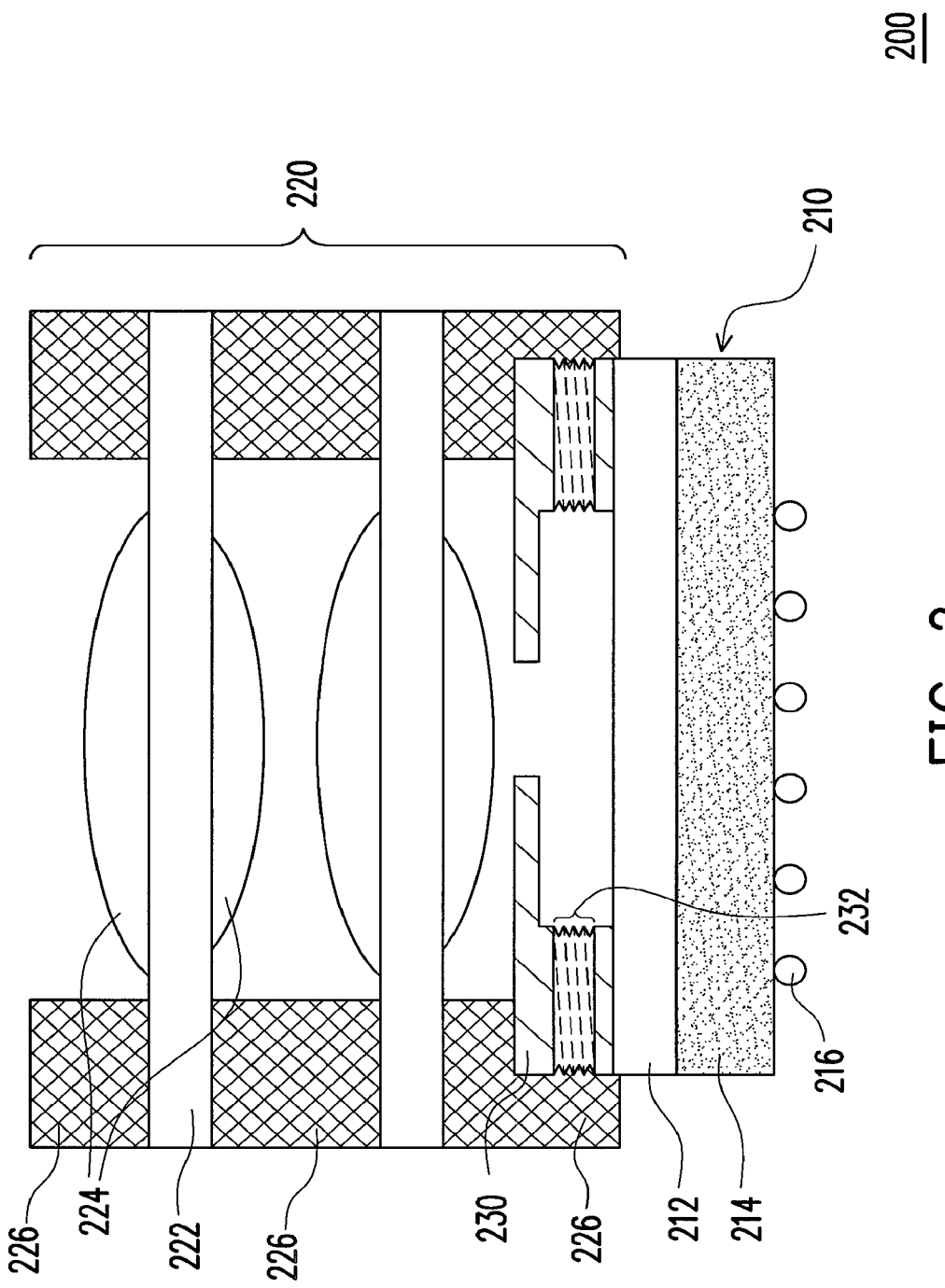
FIG. 2 is a schematic diagram of an optical system according to an embodiment of the present invention.

FIG. 2 is a schematic diagram of an optical system according to an embodiment of the present invention. Referring to FIG. 2, the optical system 200 of the present embodiment includes a photo sensor 210, a wafer level optical (WLO) lens module 220 and a focusing motor 230. In the present embodiment, the photo sensor 210 can be a complementary metal oxide semiconductor (CMOS) sensor or a charge coupled device (CCD), and the photo sensor 210 includes a cover glass 212, a photo sensor device substrate 214 and a plurality of tin balls 216. The cover glass 212 covers the photo sensor device substrate 214, and the tin balls 216 are electrically connected to the photo sensor device substrate 214.

The WLO lens module 220 is located on the photo sensor 210, and includes at least one transparent substrate 222 and at least one lens 224, wherein the at least one lens 224 is disposed on the at least one transparent substrate 222, as that shown in FIG. 2. In the present embodiment, the WLO lens module 220 includes, for example, a plurality of the transparent substrates 222 as that shown in FIG. 2, though the present invention is not limited thereto, and in another embodiment, the transparent substrate 222 can also be odd-numbered.

Moreover, spacer layers 226 shown in FIG. 2 can be configured between the transparent substrates 222, wherein the spacer layers 226 can maintain spaces between the transparent substrates 222, and a part of the lenses 224 disposed on the transparent substrates 222 can be located in the spaces. In addition, a thickness of the spacer layer 226 is determined according to a focal length of the lens 224 or a focal length of the WLO lens module 220. In the present embodiment, a material of the spacer layer 226 can be a light-shielding material or a light-absorbing material, wherein the light-shielding material or the light-absorbing material refers to a lightproof material such as black rubber. When the first spacer layer 226 uses the lightproof material, a chance that stray light enters into the lens 224 can be avoided, so that noise of image light passing through the lens 224 is reduced, and a signal-to-nose ratio (SNR) and an imaging quality of the WLO lens module 220 are increased.

In the present embodiment, the lens 224 can be a convex lens as that shown in FIG. 2, and a convex surface of the convex lens disposed on the transparent substrate 222 faces to a direction away from the transparent substrate 222. However, in another embodiment that is not illustrated, the lens 224 can also be a concave lens, which is determined according to a design requirement. Moreover, the transparent substrate 222 and the lens 224 disposed thereon can be formed integrally, i.e. a mold or a special mold can be used to fabricate the two parts integrally. Alternatively, the transparent substrate 222 and the lens 224 can be separately formed, and then the lens 224 is fabricated on the transparent substrate 222. In the present embodiment, the transparent substrate 222 and the lens 224 are separately formed, and then the lens 224 is fabricated on the transparent substrate 222, though the present invention is not limited thereto.

In an actual application, after the transparent substrates 222 and the lenses 224 are separately formed, lens substrates are formed, and then the spacer layers 226 are configured between the lens substrates. After the lens substrates are assembled, the WLO lens module 220 shown in FIG. 2 is obtained. It should be noticed that the so-called "wafer level" represents that an electronic product is fabricated according to a wafer level fabrication technique, so as to miniaturize a size of the electronic product and reduce a cost thereof.

Moreover, the focusing motor 230 is located between the WLO lens module 220 and the photo sensor 210. The focusing motor 230 can drive the WLO lens module 220 to move toward or backward the photo sensor 210 as that shown in FIG. 2. In the present embodiment, the focusing motor 230 is, for example, a stepping motor, and the focusing motor 230 includes a telescopic structure 232, wherein the telescopic structure 232 is connected to the WLO lens module 220 for driving the WLO lens module 220 to move toward or backward the photo sensor 210. In detail, the telescopic structure 232 can be a thread structure, wherein the thread structure can be inlaid to the WLO lens module 220, and when the focusing motor 230 drives the thread structure, the WLO lens module 220 is driven to move toward or backward the photo sensor 210, so that an external image light beam can be focused on the photo sensor 210 after passing through the WLO lens module 220. Therefore, by suitably controlling the telescopic structure 232 to control a telescopic distance of the WLO lens module 220, the light beam passing through the WLO lens module 220 can be imaged on the photo sensor 210, optimally.

In the present embodiment, the focusing motor 230 is located between the WLO lens module 220 and the photo sensor 210, and is connected to the WLO lens module 220. Therefore, a size of the focusing motor 230 is reduced to cope with a size of the WLO lens module 220. In other words, compared to a motor disposed outside and inlaid to the optical lens for controlling a movement of the optical lens, the size of the focusing motor 230 of the present embodiment is relatively reduced, so that a whole size of the optical system 200 using the focusing motor 230 can be reduced.

According to the above structure, the optical system 200 uses the lightproof material to serve as the spacer layer 226, so that the imaging quality of the optical system 200 is improved. Moreover, by disposing the focusing motor 230 between the WLO lens module 220 and the photo sensor 210, the size of the focusing motor 230 is reduced to cope with the size of the WLO lens module 220, so that the whole size of the optical system 200 is reduced. In other words, compared to the conventional optical system in which the focusing motor is disposed at external of the WLO lens module and controls a moving direction of the WLO lens module for focusing the WLO lens module to the photo sensor, the optical system 200 of the present embodiment has a relatively small size.

Figure 3:
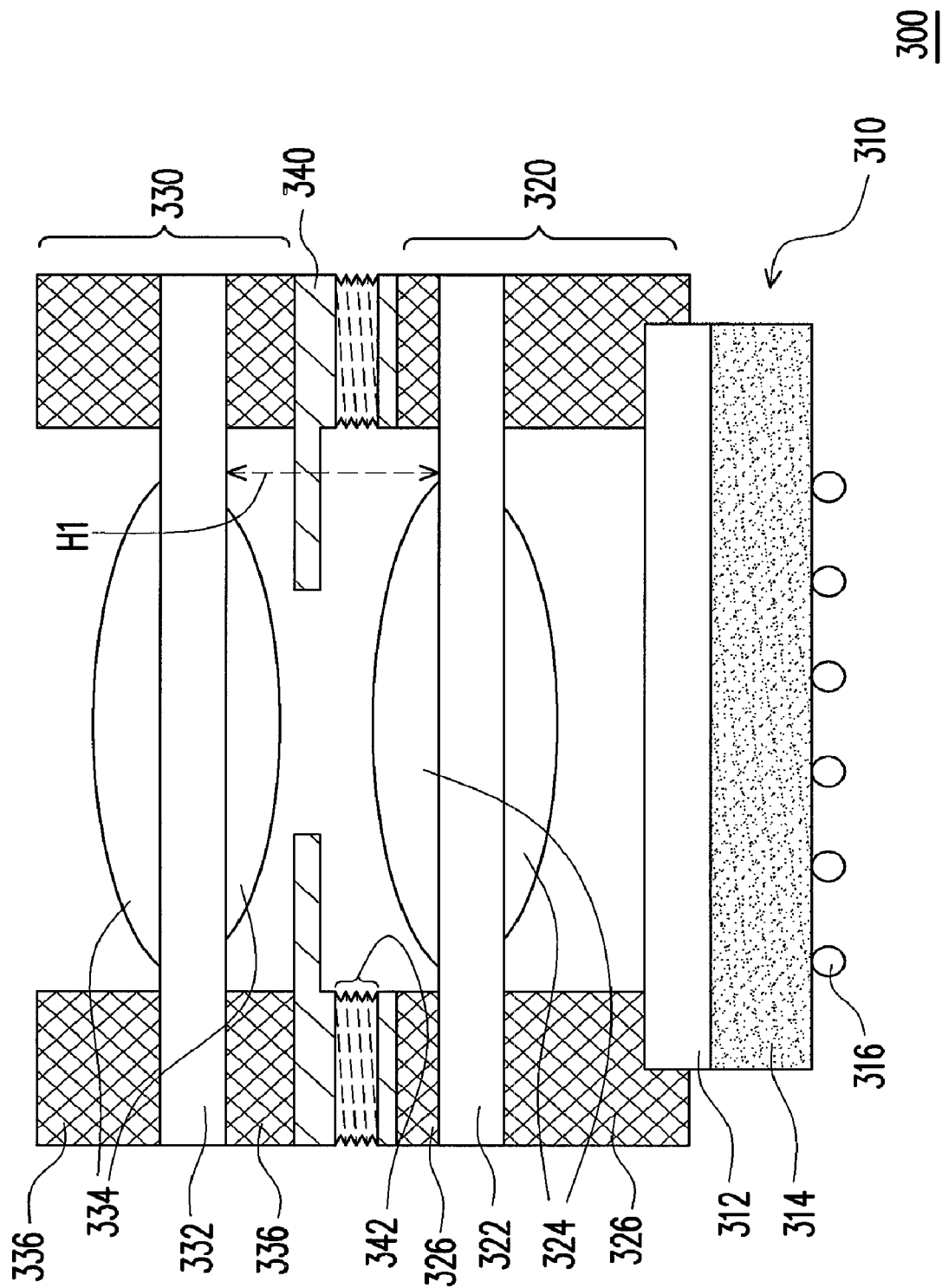
FIG. 3 is a schematic diagram of an optical system according to another embodiment of the present invention.

FIG. 3 is a schematic diagram of an optical system according to another embodiment of the present invention. Referring to FIG. 3, the optical system 300 of the present embodiment includes a photo sensor 310, a first WLO lens module 320, a second WLO lens module 330 and a focusing motor 340. In the present embodiment, the photo sensor 310 can be a CMOS sensor or a CCD, and the photo sensor 310 includes a cover glass 312, a photo sensor device substrate 314 and a plurality of tin balls 316. The cover glass 312 covers the photo sensor device substrate 314, and the tin balls 316 are electrically connected to the photo sensor device substrate 314.

The first WLO lens module 320 is disposed on the photo sensor 310, and includes a first transparent substrate 322 and a first lens 324, wherein the first lens 324 is disposed on the first transparent substrate 322, as that shown in FIG. 3. In the present embodiment, the first WLO lens module 320 includes, for example, one first transparent substrate 322 as that shown in FIG. 3, though the present invention is not limited thereto, and in another embodiment, a number of the first transparent substrate 322 can be plural, i.e. the first WLO lens module 320 can also be the WLO lens module 220 of FIG. 2.

Moreover, a first spacer layer 326 can be disposed on the first transparent substrate 322 as that shown in FIG. 3, wherein the first spacer layer 326 can maintain a space between the first transparent substrate 322 and the photo sensor 310 and maintain a space between the first transparent substrate 322 and the focusing motor 340, and the first lens 324 disposed on the first transparent substrate 322 is located in the space. In addition, a thickness of the first spacer layer 326 is determined according to a focal length of the first lens 324. In the present embodiment, a material of the first spacer layer 326 can be a light-shielding material or a light-absorbing material, wherein the light-shielding material or a light-absorbing material refers to a lightproof material such as black rubber. When the first spacer layer 326 uses the lightproof material, a chance that stray light enters the first lens 324 can be avoided, so that noise of image light passing through the first lens 324 is reduced, and a signal-to-nose ratio (SNR) and an imaging quality of the first WLO lens module 320 are increased.

In the present embodiment, the first lens 324 can be a convex lens as that shown in FIG. 3, and a convex surface of the convex lens disposed on the first transparent substrate 322 faces to a direction away from the first transparent substrate 322. However, in another embodiment that is not illustrated, the first lens 324 can also be a concave lens, which is determined according to a design requirement. Moreover, the first transparent substrate 322 and the first lens 324 disposed thereon can be formed integrally, i.e. a mold or a special mold can be used to fabricate the two parts integrally. Alternatively, the first transparent substrate 322 and the first lens 324 can be separately formed, and then the first lens 324 is fabricated on the first transparent substrate 322. In the present embodiment, the first transparent substrate 322 and the first lens 324 are separately formed, and then the first lens 324 is fabricated on the first transparent substrate 322, though the present invention is not limited thereto.

The second WLO lens module 330 is located above the first WLO lens module 320, and a space H1 is maintained between the first WLO lens module 320 and the second WLO lens module 330, as that shown in FIG. 3. The second WLO lens module 330 includes a second transparent substrate 332 and a second lens 334, wherein the second lens 334 is disposed on the second transparent substrate 332. Similarly, the second WLO lens module 330 includes, for example, one second transparent substrate 332 as that shown in FIG. 3, though the present invention is not limited thereto, and in another embodiment, a number of the second transparent substrate 332 can be plural, i.e. the second WLO lens module 330 can also be the WLO lens module 220 of FIG. 2.

Moreover, a second spacer layer 336 can be disposed on the second transparent substrate 332 as that shown in FIG. 3, wherein a thickness of the second spacer layer 336 is determined according to a focal length of the second lens 334. In the present embodiment, a material of the second spacer layer 336 can be a light-shielding material or a light-absorbing material, wherein the light-shielding material or a light-absorbing material refers to a lightproof material such as black rubber. When the second spacer layer 336 uses the lightproof material, a chance that stray light enters the second lens 334 can be avoided, so that noise of image light passing through the second lens 334 is reduced, and a SNR and an imaging quality of the second WLO lens module 330 are increased.

Similarly, the second lens 334 can be a convex lens as that shown in FIG. 3, and a convex surface of the convex lens disposed on the second transparent substrate 332 faces to a direction away from the second transparent substrate 332. However, in another embodiment that is not illustrated, the second lens 334 can also be a concave lens, which is determined according to a design requirement. Moreover, the second transparent substrate 332 and the second lens 334 disposed thereon can be formed integrally, i.e. a mold or a special mold can be used to fabricate the two parts integrally. Alternatively, the second transparent substrate 332 and the second lens 334 can be separately formed, and then the second lens 334 is fabricated on the second transparent substrate 332. In the present embodiment, the second transparent substrate 332 and the second lens 334 are separately formed, and then the second lens 334 is fabricated on the second transparent substrate 332, though the present invention is not limited thereto.

The focusing motor 340 is located between the first WLO lens module 320 and the second WLO lens module 330, and is suitable for moving the first WLO lens module 320 or the second WLO lens module 330 to adjust the space H1. In the present embodiment, the focusing motor 340 is, for example, a stepping motor, and the focusing motor 340 includes a telescopic structure 342. The telescopic structure 342 can be elongated or shortened when being driven by the focusing motor 340. Therefore, the space H1 maintained between the first WLO lens module 320 and the second WLO lens module 330 can be controlled by the telescopic structure 342. Namely, when the telescopic structure 342 is driven by the focusing motor 340 and is elongated, the space H1 between the first WLO lens module 320 and the second WLO lens module 330 is increased, and when the telescopic structure 342 is driven by the focusing motor 340 and is shortened, the space H1 between the first WLO lens module 320 and the second WLO lens module 330 is decreased. Therefore, by suitably controlling elongation and shortening of the telescopic structure 342 to control the space H1 between the first WLO lens module 320 and the second WLO lens module 330, the light beam passing through the first WLO lens module 320 and the second WLO lens module 330 can be imaged on the photo sensor 310, optimally.

According to the above descriptions, a structure of the optical system 300 of the present embodiment is similar to that of the aforementioned optical system 200, and a difference there between is that in the optical system 300, the focusing motor 340 is disposed between the first WLO lens module 320 and the second WLO lens module 330, and the space H1 between the first WLO lens module 320 and the second WLO lens module 330 is adjusted by moving the first WLO lens module 320 and the second WLO lens module 330, so as to achieve an optical function.

Since the structure of the optical system 300 is similar to that of the aforementioned optical system 200, the optical system 300 of the present embodiment also has the advantages that the optical system 200 has.

In summary, in the optical system of the present invention, the lightproof material is used as the spacer layer, so that the imaging quality of the optical system can be improved. Moreover, the focusing motor can be disposed between the WLO lens module and the photo sensor or between the WLO lenses, so that the size of the focusing motor is relatively reduced to cope with the size of the WLO lens module, and therefore a whole size of the optical lens can be reduced. In addition, since the focusing motor is disposed between the WLO lens module and the photo sensor or between the WLO lenses, during imaging, the optical system may have a [[zoom]]ing function and a focusing function, and an image light can be imaged on the photo sensor, optimally.

In other words, the optical system of the present invention not only has a relatively small size, but also has a good optical imaging quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical system, comprising:
    a photo sensor;
    a first WLO lens module, disposed on the photo sensor, and comprising a first transparent substrate and a first lens, wherein the first lens is disposed on the first transparent substrate and the materials of the first transparent substrate and the first lens are different;
    a second WLO lens module, located above the first WLO lens module, and a space being maintained between the first WLO lens module and the second WLO lens module, the second WLO lens module comprising a second transparent substrate and a second lens, wherein the second lens is disposed on the second transparent substrate and the materials of the second transparent substrate and the second lens are different; and
    a focusing motor, located between the first WLO lens module and the second WLO lens module, and suitable for moving the first WLO lens module or the second WLO lens module to adjust the space
    a plurality of spacer layers, respectively disposed between the first transparent substrate and the focusing motor and between the second transparent substrate and the focusing motor.

2. The optical system as claimed in claim 1, wherein a material of the spacer layers is a light-shielding material or a light-absorbing material.

3. The optical system as claimed in claim 1, wherein the at least one first lens and the at least one second lens comprise a convex lens or a concave lens.

4. The optical system as claimed in claim 1, wherein the focusing motor comprises a telescopic structure, wherein the telescopic structure is connected to the first WLO lens module or the second WLO lens module, so as to move the first WLO lens module or the second WLO lens module to adjust the space.

5. The optical system as claimed in claim 4, wherein the telescopic structure comprises a thread structure.

6. The optical system as claimed in claim 1, wherein the focusing motor is a stepping motor.

7. The optical system as claimed in claim 1, wherein the photo sensor is a CMOS sensor or a CCD.

* * * * *